United States Patent
Chertov et al.

(10) Patent No.: US 10,877,834 B2
(45) Date of Patent: Dec. 29, 2020

(54) LOGGING REBOOTS OF NETWORK DEVICES

(71) Applicant: Arista Networks, Inc., Santa Clara, CA (US)

(72) Inventors: Roman Chertov, Santa Clara, CA (US); Chetandeep Singh, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 161 days.

(21) Appl. No.: 16/191,350

(22) Filed: Nov. 14, 2018

(65) Prior Publication Data

US 2020/0151043 A1    May 14, 2020

(51) Int. Cl.
- *G06F 11/00* (2006.01)
- *G06F 11/07* (2006.01)
- *G06F 9/4401* (2018.01)

(52) U.S. Cl.
CPC ........ *G06F 11/079* (2013.01); *G06F 11/0709* (2013.01); *G06F 11/0751* (2013.01); *G06F 11/0778* (2013.01); *G06F 9/4401* (2013.01)

(58) Field of Classification Search
CPC ............... G06F 11/079; G06F 11/0709; G06F 11/0778; G06F 11/0751; G06F 9/4401
USPC ........................................................ 714/37
See application file for complete search history.

(56) References Cited

U.S. PATENT DOCUMENTS

| | | | |
|---|---|---|---|
| 2007/0207800 A1* | 9/2007 | Daley | H04L 43/00 455/425 |
| 2012/0173859 A1* | 7/2012 | Wang | G06F 9/4401 713/2 |
| 2013/0198310 A1* | 8/2013 | Higashiyama | G06F 11/0724 709/212 |

* cited by examiner

*Primary Examiner* — Yair Leibovich
(74) *Attorney, Agent, or Firm* — Haley Guiliano LLP (57) ABSTRACT

In some implementations, a method is provided. The method includes detecting a reboot of a network device. The method also includes determining a set of causes for a reboot of the network device. The method further includes updating a reboot log to include a first entry associated with the reboot of the network device. The first entry indicates the set of causes for the reboot of the network device. The reboot log includes a plurality of previous entries. The plurality of previous entries are associated with previous reboots of the network device. The plurality of previous entries indicates previous sets of causes for the previous reboots of the network device.

20 Claims, 6 Drawing Sheets

LOGGING REBOOTS OF NETWORK DEVICES

BACKGROUND

A network device may be a device (e.g., a computing device, an electronic device etc.) capable of communicating data with other devices through a wired or wireless connection or set of connections. For example, a network device may receive data from a first device (e.g., a first computing device, a first switch, a first router, etc.) and may forward the data to a second device (e.g., a first computing device, a first switch, a first router, etc.). During the operation of the network device, the network device may reboot (e.g., reset, turn off and on, power cycle, reload, etc.) for various reasons. For example, the network device may reboot due to a software upgrade, a power loss, etc.

SUMMARY

In some implementations, a method is provided. The method includes detecting a reboot of a network device. The method also includes determining a set of causes for a reboot of the network device. The method further includes updating a reboot log to include a first entry associated with the reboot of the network device. The first entry indicates the set of causes for the reboot of the network device. The reboot log includes a plurality of previous entries. The plurality of previous entries is associated with previous reboots of the network device. The plurality of previous entries indicates previous sets of causes for the previous reboots of the network device.

In some implementations, a network device is provided. The network device includes a persistent memory to store a reboot log. The network device also includes a processing device coupled to the memory. The processing device is configured to detect a reboot of the network device. The processing device is also configured to determine a set of causes for the reboot of the network device. The processing device is further configured to update the reboot log to include a first entry associated with the reboot of the network device. The first entry indicates the set of causes for the reboot of the network device. The reboot log includes a plurality of previous entries. The plurality of previous entries is associated with previous reboots of the network device. The plurality of previous entries indicates previous sets of causes for the previous reboots of the network device.

In some implementations, a non-transitory machine-readable medium is provided. The non-transitory machine-readable medium includes executable instructions to cause one or more processing devices to perform a method to update a reboot log. The method includes detecting a reboot of a network device. The method also includes determining a set of causes for a reboot of the network device. Determining the set of causes includes determining that a set of log files are present in a storage location of a memory of the network device. Determining the set of causes also includes analyzing the set of log files to determine the set of causes. Determining the set of causes further includes updating the reboot log to include a first entry associated with the reboot of the network device. The first entry indicates a first set of causes for the reboot of the network device. The reboot log includes a plurality of previous entries. The plurality of previous entries is associated with previous reboots of the network device. The plurality of previous entries indicates previous sets of causes for the previous reboots of the network device.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

As discussed above, a network device may be a device (e.g., a computing device, an electronic device, etc.) that may communicate data with other devices (e.g., may receive data from a first device and may forward the data to a second device. During the operation of the network device, the network device may reboot (e.g., reset, turn off and on, power cycle, reload, etc.) for various reasons. For example, the network device may reboot due to a software upgrade, a power loss, etc.

A network device may generally include a log (e.g., a crash log, a debug log, a reset log) or other file/data that may provide information about the last time the network device was rebooted. Each time the network device is rebooted the old log may be removed and/or or overwritten. In addition, the log may not include all of the causes or reasons for the reboot of the network device. For example, the log may include a core/memory dump of one process that was executing on the network device.

Figure 1:
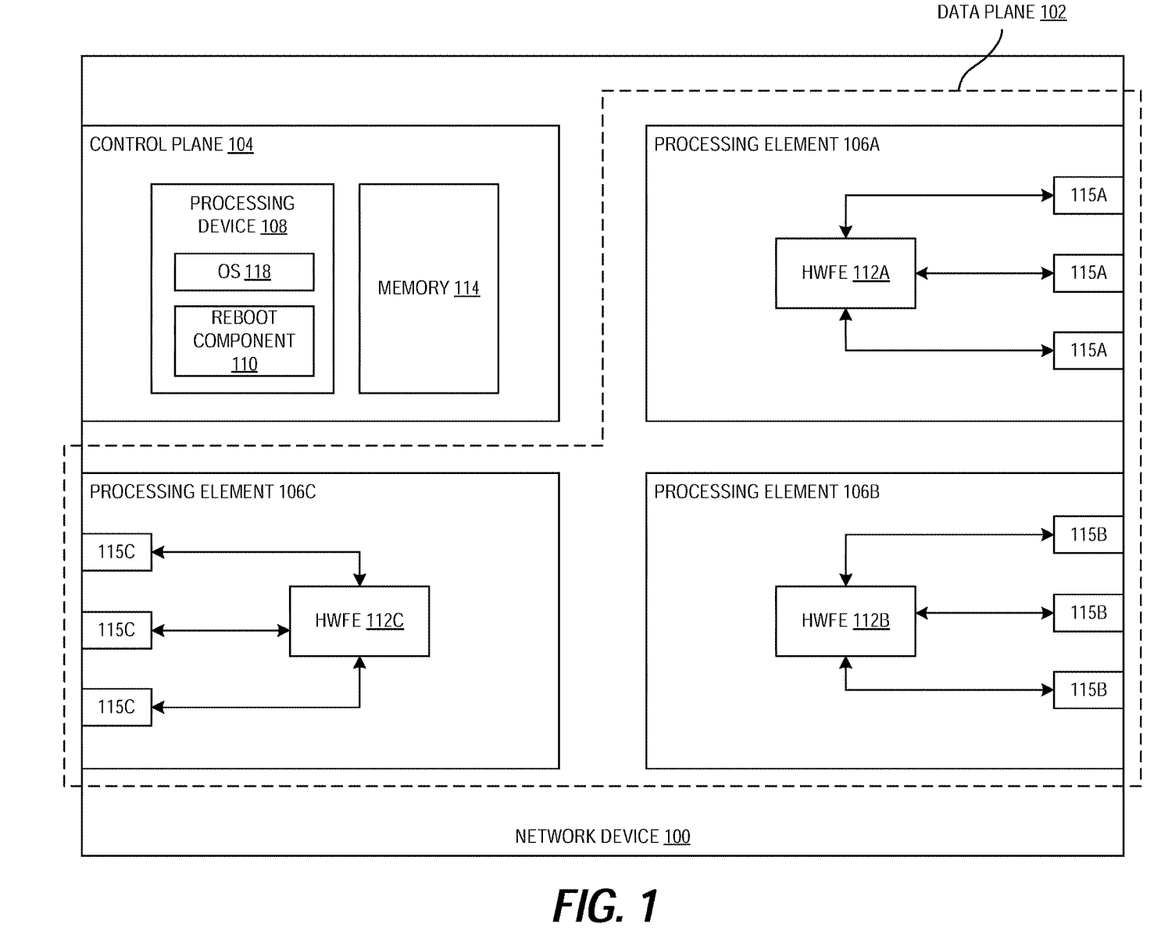
FIG. 1 is a block diagram illustrating an example of a network device, in accordance with some embodiments of the present disclosure.

FIG. 1 is a block diagram of one embodiment of a network device 100 that includes a control plane 104 and a data plane 102. In one embodiment, the data plane 102 receives, processes, and forwards network data using various configuration data (e.g., packet forwarding (routing, switching, or another type of packet forwarding), security, quality of service (QoS), and other network traffic processing information). For example, for each received packet of the network traffic, the data plane 102 determines a destination address of that packet, looks up the requisite information for that destination in one or more memories of data plane 102, and forwards the packet out the proper outgoing interface. The data plane 102 includes multiple data processing elements 106A-C that can each receive, process, and/or forward network traffic. In one embodiment, each data processing elements 106A-C includes a hardware forwarding engine (HWFE) 112A-C and ports 115A-C, respectively.

In one embodiment, the control plane 104 includes processing device 108 (e.g., a central processing unit (CPU)) and a memory 114. As discussed herein, processing device 108 is interchangeably referred to as a control plane processor of network device 100. The processing device 108 is used to process information for the control plane 104 and write configuration data for hardware forwarding engines 112A-C in the data processing elements 106A-C. The information processed by processing device 108 includes, for example, control plane data corresponding to a plurality of different classes of control plane traffic, such as routing protocol messages, routing table messages, routing decisions messages, route update messages, unresolved traffic messages, L2 protocol messages, link aggregation control protocol messages, link layer state updates messages (e.g., spanning tree messages), link state update messages (e.g., link aggregation control protocol messages for a link aggregation group, bidirectional forwarding detection messages, etc.), exception packets that cannot be dealt with in hardware (e.g., router alerts, transmission time interval messages, maximum transmission size exceeded messages, etc.), program messages (e.g., packets from a controller instructing the programming of a network device), messages for routing table misses, time control messages (e.g., precision time protocol messages), messages for packets marked as being of interest for snooping (e.g., access control list logging and port mirroring messages), messages used to collect traffic diagnostics, address resolution messages (ARP) requests and replies, neighbor solicitation requests and replies, general communication to the control plane of the networking device, etc. Processing device 108 processes the control plane network data to perform control management updates and/or respond with control message responses (e.g., routing decisions, protocol updates, traffic resolutions, etc.).

In one embodiment, the processing device 108 includes an operating system (OS) 118 that is executing various processes. In this embodiment, the processes execute various aspects of the functionality of the control plane 104. For example, the processes may be used for quality of service, access control lists management (or other types of security), policy service, etc. Other examples of processes may include a fan agent, a light emitting diode agent, a temperature sensor agent, a database service, management service(s), processes to support networking protocols (e.g., spanning tree protocol (STP), routing protocols (e.g., such as routing information protocol (RIP), border gateway protocol (BGP), open shortest path first (OSPF), intermediate system-intermediate system (IS-IS), interior gateway routing protocol (IGRP), enhanced IGRP (EIGRP), protocol independent multicast (PIM), distance vector multicast routing protocol (DVMRP), and any/or other type or unicast or multicast routing protocol), Multiprotocol Label Switching (MPLS), and/or other types of networking protocols), network flow management applications (e.g., openflow, directflow), process manager, and/or other types of processes for other types of functionality of the network device 100.

In one embodiment, for each received unit of network data (e.g., a packet), the data plane 102 determines a destination address for the network data, looks up the requisite information for that destination in one or more tables stored in the data plane, and forwards the data out the proper outgoing interface, for example, one of the data processing elements 106A-C. In one embodiment, each data processing elements 106A-C includes one or more hardware forwarding engines (HWFE(s)) 112A-C and ports 115A-C, respectively. Each hardware forwarding engine 112A-C forwards data for the network device 100, such as performing routing, switching, or other types of network forwarding or processing.

In one embodiment, the network device 100 may be any type of device that can communicate network data with another device (e.g., a personal computer, laptop, server, mobile device, a phone, a smartphone, a personal gaming device, another network device, switch, router, hub, bridge, gateway, etc.). For example the network device 100 may receive data from a first device and may forward the data to another device, and vice versa. In one embodiment, the network device 100 may be a virtual machine or a container. The network device 100 may also be a device that hosts one or more virtual machines and/or containers.

As discussed above, the network device 100 may reboot for various reasons. It may be useful to save information about not only the latest reboot of the network device 100, but about previous reboots as well. For example, it may be useful to save information about the last ten, twenty, or some other appropriate number of reboots. In addition, the network device may reboot for multiple reasons. Thus, it may also be useful to save information about the various reasons for a reboot of the network device 100.

The network device 100 includes a reboot component 110. Reboot component 110 may be software (e.g., an application, an app, etc.) hardware, (e.g., a processing device, a circuit, etc.), firmware, or a combination thereof. As an example, in one embodiment, reboot component 110 includes an agent of Arista Networks' Extensible Operating System (EOS®) operating on a switch. Reboot component 110 may create and/or update a reboot log that may include multiple entries. Each of the entries may be associated with a reboot of the network device. Each entry may indicate or include a set of causes or reasons for the reboot associated with the entry. The reboot log may be persistent across multiple reboots (e.g., the reboot log may be stored in a non-volatile memory and may be accessible across multiple reboots of the network device 100). In some embodiments, reboot component 110 and/or the reboot log may allow the network device 100 to store, record, etc., information about multiple reboots and provide that information to users and/or other computing devices. This may allow the users and/or other computing devices to analyze the reboots of the network device 100 and determine whether there are issues, problems, etc., that may be causing the reboots. This may also allow the users and/or other computing devices to determine whether the network device 100 is operating properly.

Figure 2:
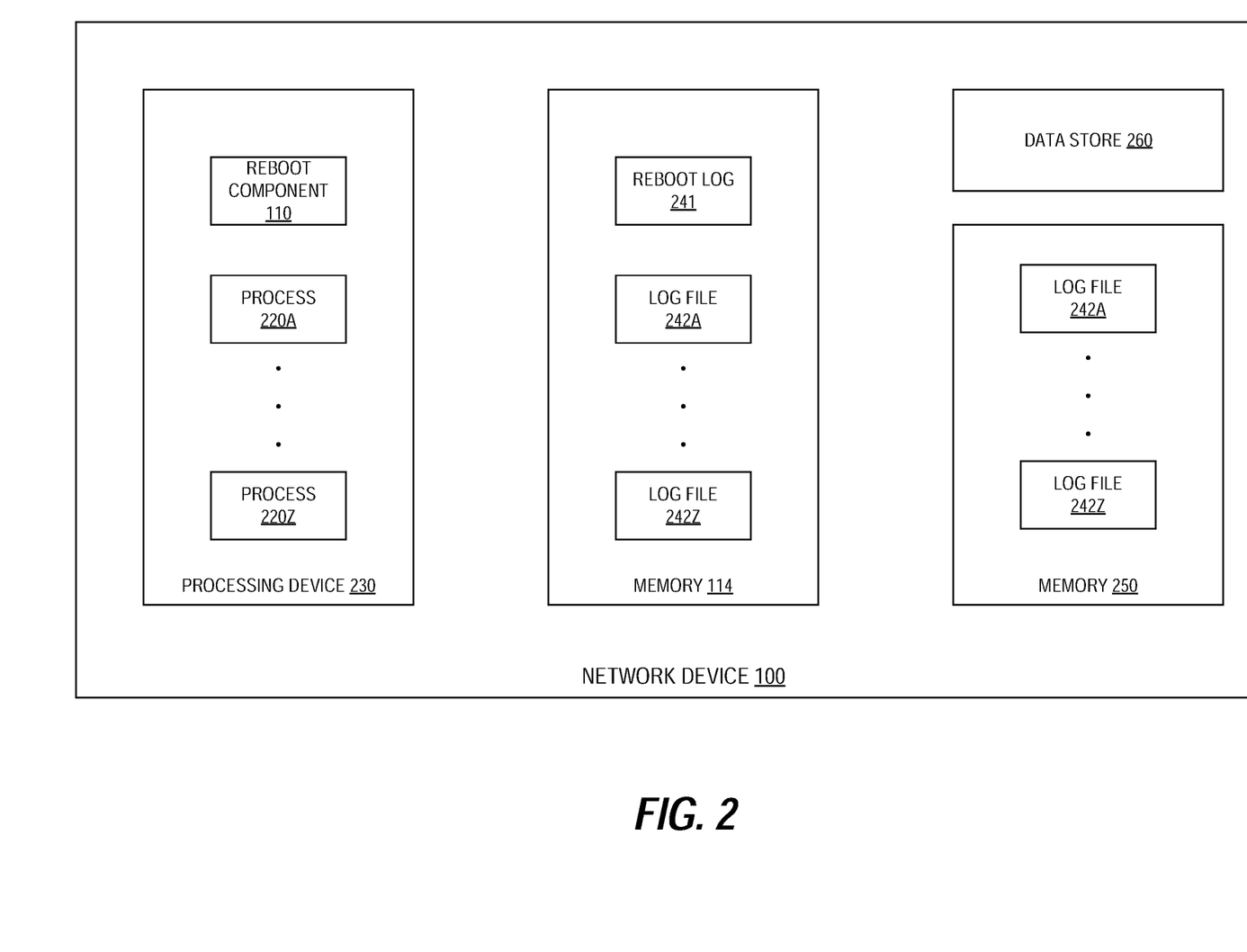
FIG. 2 is a block diagram illustrating an example of a network device, in accordance with some embodiments of the present disclosure.

FIG. 2 is a block diagram illustrating an example network device, in accordance with some embodiments of the present disclosure. The network device 100 includes a processing device 108, a memory 114, a memory 250, and a data store 260. In one embodiment, memory 114 may be a non-volatile memory. A non-volatile memory may be a device that is capable of storing data, where the data remains stored and/or accessible even if the non-volatile memory loses power, is reset, etc. For example, memory 114 may be a flash memory, a hard disk, a disk drive, a flash chip, etc. The memory 250 may be a volatile memory. A volatile memory may be a device that is capable of storing data, where the data is lost or no longer accessible if the non-volatile memory loses power, is reset, etc. For example, memory 250 may be a random access memory (RAM) that loses data if power is no longer supplied to the RAM. In another embodiment, memory 114 and memory 250 may be combined or be a single component that accomplishes the functions of each as described herein.

The processing device 108 includes a reboot component 110 and processes 220A through 220Z. The processes 220A through 220Z may be various services and/or agents that perform different tasks, functions, operations, and/or actions for the network device 100. For example, one of the processes may be a process that monitors the temperatures of components of the network device 100. In another example, one of the processes 220A through 220Z may be a process that operates light emitting diodes (LEDs) of the network device 100. In some embodiments, reboot component 110 may be separate from the processing device 108 (e.g., may be a separate circuit, field programmable gate array (FPGA), application specific integrated circuit (ASIC), a process running on another processing device, etc.)

In one embodiment, reboot component 110 may detect a reboot (e.g., a reset, a power cycle, etc.) of the network device 100. Reboot component 110 may detect that the network device 100 will reboot, before the network device 100 reboots. For example, reboot component 110 may detect or determine that the network device 100 will reboot in the next 30 seconds, next minute, etc. Reboot component 110 may also detect or determine that the network device 100 has rebooted during the reboot of the network device 100. Reboot component 110 may also detect or determine that the network device 100 has rebooted, after the network device 100 reboots.

In one embodiment, reboot component 110 may determine a set of causes (e.g., one or more causes) for the reboot of the network device 100. For example, reboot component 110 may determine that the network device 100 was rebooted due to a software upgrade (e.g., a new software image was installed on the network device 100). In another example, reboot component 110 may determine that the network device 100 was rebooted due to a power loss. In a further example, reboot component 110 may determine that the network device 100 was rebooted due to a component overheating and due to a crashed process/agent (e.g., due to multiple causes). In another embodiment, reboot component 110 may determine the set of causes for the reboot of the network device 100 based on log files stored in a memory location, as discussed in more detail below.

In one embodiment, reboot component 110 may update a reboot log 241 to include an entry that is associated with the reboot of the network device 100. For example, reboot component 110 may add a new entry in reboot log 241 and the new entry may be associated with the reboot of the network device 100. In another example, reboot component 110 may remove a previous entry (e.g., an old or older entry) in reboot log 241 and may add a new entry that is associated with the reboot of the network device 100 (e.g., may replace an entry).

In one embodiment, reboot log 241 may be a file or other data object that may include multiple entries (e.g., multiple portions, multiple segments, multiple chunks, etc.). Each entry is associated with a reboot of the network device 100. For example, each entry may be created by reboot component 110 when the network device 100 reboots. Reboot log 241 may include an entry associated with the more recent reboot (e.g., the last or latest reboot) of the network device 100. Reboot log 241 may also include multiple previous entries. The previous entries may be associated with previous reboots of the network device 100. For example, the previous entries may be associated reboots that occurred prior to the most recent reboot of the network device 100.

In one embodiment, each entry in reboot log 241 may include data (e.g., text, strings, alphanumeric values, numbers, etc.) that indicates a set of causes (e.g., one or more causes) for the reboot associated with the entry. For example, each entry in reboot log 241 may include numbers, values, strings, alphanumeric text, or other data that may indicate one or more reasons why the network device 100 was rebooted. Thus, reboot log 241 may have a first entry that indicates a set of causes for the latest (e.g., the last, the most recent, etc.) reboot of the network device 100 and one or more previous entries that indicate sets of causes for the previous reboots of the network device 100.

In one embodiment, reboot component 110 may determine the set of causes by determining that a set of log files are present in a storage location of a memory. For example, reboot component 110 may determine that log files 242A through 242Z are present (e.g., are stored) in a storage location (e.g., a file path, a directory, a memory address, a memory location, a logical address, etc.) of memory 114. In another example, reboot component 110 may determine that log files 242A through 242Z are present (e.g., are stored) in a storage location (e.g., a file path, a directory, a memory address, a memory location, a logical address, etc.) of memory 250. In different embodiments log files 242A through 242Z may be stored in one or more of the memories 114 and 250. For example, all of log files 242A through 242Z may be stored in memory 114. In another example, all of log files 242A through 242Z may be stored in memory 250. In a further example, log files 242A through 242Z may be stored on both the memories 114 and 250. In yet another example, some of log files 242A through 242Z may be stored in memory 114 and some of log files 242A through 242Z may be stored in memory 250.

In one embodiment, each of log files 242A through 242Z may be generated by one of the processes 220A through 220Z executing on the network device 100 (e.g., running on the processing device 108). For example, process 220A may be a process (e.g., a service, an agent, etc.) that monitors the temperature of one or more components of the network device 100. The process 220A may generate log file 242A (which may be stored in one or more of the memories 114 and 250) that may indicate the temperature of one or more components and may indicate that the network device 100 was rebooted because the temperature of a component exceeded a threshold temperature (e.g., the temperature of the component was too high). In an embodiment, these log files 242A-Z are temporary, which may in part be because memory is often at a premium in network devices 100. Log files 242A-Z may be overwritten during or after a reboot to allow restarted processes to utilize memory that may be limited. However, it can be important to store key aspects of one or more of these log files 242A-Z in determining reboot causes over time.

In one embodiment, one or more of the processes 220A through 220Z may be responsible or may be partially responsible for the reboot of the network device 100. For example, the reboot of the network device 100 may be initiated or initiated in part by one or more of the processes 220A through 220Z. As discussed above, the processes 220A through 220Z may perform various functions, operations, actions, etc., for the network device 100. While performing the various functions, operations, actions, etc., one or more of the processes 220A through 220Z may determine that the network device 100 should be rebooted. For example, process 220B may be a process (or service) that may upgrade the software image (e.g., install new software, a new firmware image, etc.) that is used by the network device 100. The process 220B may install the new software image and may indicate to another process or the OS of the network device 100, that the network device 100 should be rebooted for the new software image to take effect (e.g., for the network device 100 to load and/or start using the new software image). The other process or the OS of the network device 100 may reboot the network device 100 based on the indication from process 220B. In another example, process 220C may be a process that monitors the statuses or states of other processes (e.g., may be a watchdog process). The process 220C may determine that another process that is important to the operation of the network device 100 is not responsive (e.g., has frozen, crashed, etc.) and may reboot the network device 100 because the network device 100 may not operate or function properly without the other process.

In one embodiment, reboot component 110 analyzes one or more of log files 242 to determine one or more causes of the reboot. For example, log file 242A may indicate that the temperature of a component in the network device 100 exceeded a temperature threshold, and log file 242B may indicate that a process that is important to the operation of the network device 100 has crashed. The log files 242A and 242B may have been generated as part of the reboot process for the network device 100 (e.g., may have been generated by a process that initiated the reboot, may have been generated by the OS of the network device 100, etc.). Reboot component 110 may analyze log files 242A and 242B and may determine one or more causes (e.g., reasons) for the reboot based on log files 242A and 242B. For example, reboot component 110 may determine that the network device 100 was rebooted because a component of the network device 100 overheated and because a process on the network device 100 crashed. Reboot component 110 may update reboot log 241 to include these causes in the entry associated with the reboot of the network device 100.

In one embodiment, reboot component 110 may delete log files 242A through 242Z after analyzing log files 242A through 242Z. For example, after analyzing log files 242A through 242Z to determine one or more causes of the reboot and after adding an entry to reboot log 241 with the one or more causes, reboot component 110 may delete (e.g., remove) log files 242A through 242Z from their respective storage locations in the memories 114 and/or 250. In other embodiments, reboot component 110 may not delete log files log files 242A through 242Z, but may rename log files 242A through 242Z or may move log files 242A through 242Z to a different storage location. This may allow reboot component 110 to determine that log files 242A through 242Z have already been analyzed.

In another embodiment, one or more of the processes 220A through 220Z may delete, move, and/or rename one or more of the log files 242A through 242Z. For example, process 220A may create log file 242A. After the reboot of the network device 100 (e.g., after the log file 242A has been analyzed by the reboot component 110), the process 220A may delete the log file 242A, move the log file 242A to another storage location, and/or rename the log file 242A. The reboot component 110 may provide an indication that the reboot component has analyzed the log file 242A. For example, the reboot component 110 may write a flag, value, or other data in the log file 242A to indicate that the reboot component 110 has analyzed the log file. The service 220A may delete the log file 242A, move the log file 242A to another storage location, and/or rename the log file 242A, when the service 220 detects the flag, value, etc.

In a further embodiment, a separate service (not illustrated in the figures) may delete, move, and/or rename one or more of the log files 242A through 242Z. For example, the separate service may be a cleanup service that may go through the storage location where the log files 242A through 242Z are stored to delete, move, and/or rename the log files 242A through 242Z. The reboot component 110 may provide an indication that the reboot component has analyzed the log files 242A through 242Z (e.g., may write a flag, value, or other data to each of the log files 242A through 242Z). The separate service may delete the log files 242A through 242Z, move the log files 242A through 242Z to another storage location, and/or rename the log files 242A through 242Z, when the separate service detects the flags, values, etc.

In one embodiment, reboot component 110 may update reboot log 241 by determining whether reboot log 241 is present in memory 114. For example, reboot component 110 may determine whether reboot log 241 is present in a storage location (e.g., a directory, a memory address, etc.) in memory 114. If reboot log 241 is not present in memory 114, reboot component 110 may create reboot log 241 and may add an entry associated with the current (e.g., latest) reboot of the network device 100 (e.g., may update reboot log 241). If reboot log 241 is present in memory 114, reboot component 110 may update reboot log 241, as discussed in more detail below.

In one embodiment, reboot component 110 may update reboot log 241 by determining whether there is space in reboot log 241 (e.g., whether there is space available) to add a new entry for the latest (e.g., the current, the most recent, etc.) reboot of the network device 100. For example reboot component 110 may determine that reboot log 241 should include a specified number of entries. The specified number of entries may be based on user input (e.g., user input received via a command line interface (CLI)), a configuration parameter or setting of the network device (e.g., a setting or parameter in a configuration file), etc. The specified number of entries may be changeable or configurable by a user (e.g., the specified number of entries may be changed to different values). Reboot component 110 may determine whether reboot log 241 already has the specified number of entries. If reboot log 241 already has the specified number of entries, reboot component 110 removes or overwrites one of the existing entries in reboot log 241 adding a new entry associated with the most current reboot of the network device 100 (e.g., replace a previous entry with the new entry). If reboot log 241 does not have the specified number of entries, reboot component 110 may add the new entry associated with the current reboot of the network device 100 (e.g., without removing a previous entry). In another example, reboot component 110 may determine whether a new entry should be added to reboot log 241 based on a threshold size (e.g., a size in kilobytes, megabytes, etc.). If adding the new entry will cause the size of reboot log 241 to exceed the threshold size, reboot component 110 may remove a previous entry and add the new entry (e.g., replace the previous entry with the new entry). If adding the new entry will not cause the size of reboot log 241 to exceed the threshold size, reboot component 110 may add the new entry (e.g., without removing a previous entry).

In one embodiment, reboot component 110 may identify a previous entry in reboot log 241 to remove if there is not enough space in reboot log 241 to add a new entry for the latest (e.g., the current, the most recent, etc.) reboot of the network device 100. Reboot component 110 may use various parameters, factors, criteria, etc., when identifying a previous entry in reboot log 241 to remove. For example reboot component 110 may identify a previous entry in reboot log 241 to remove based on a timestamp in the previous entry. Each entry may include a timestamp (or other data) indicating a date and/or time when the reboot (associated with the entry) occurred. The timestamp may also indicate when the entry was created in reboot log 241. Reboot component 110 may identify the oldest entry in reboot log 241 based on the timestamps of the entries and may remove the oldest entry. In another example, reboot component 110 may identify a previous entry in reboot log 241 based on the set of causes for the previous entry. Reboot component 110 may determine that different causes or type of causes should be prioritized differently. For example, reboot component 110 may identify and prioritize removal of entries where the causes do not indicate that an error or malfunction occurred (e.g., reboots that were initiated by a user, reboots due to a software upgrade).

In one embodiment, reboot component 110 may update reboot log 241 before the network device 100 reboots. For example, reboot component 110 may analyze one or more log files 242A through 242Z and add an entry (and optionally remove a previous entry) before the network device 100 is rebooted. In another embodiment reboot component 110 may update reboot log 241 after the network device 100 reboots. For example, reboot component 110 may add an entry (and optionally remove a previous entry) after the network device 100 is rebooted. In still another embodiment, reboot component 110 may add an entry prior to or during the reboot and update the cause information after the reboot is completed. In some instances, for example, not all log files 242N may be ready for processing during a reboot, and reboot component 110 may process a log file after the reboot is complete.

In one embodiment, each entry in reboot log 241 may include additional data or information, in addition to the set of causes. For example, each entry may include a timestamp, as mentioned above, and/or debug information. For example, each entry may include error codes, memory dumps, core dumps, etc., which may be used to diagnose, determine, analyze, assess, etc., the causes of the reboot. In a further example, each entry may include one or more recommended actions for fixing, addressing, correcting, etc., one or more errors and/or conditions that may have caused the network device 100 to reboot. For example, an entry may have a cause that indicates that the temperature for a component was too high. The entry may also include a recommended action that indicates that a fan for the component should be checked to determine whether the fan is operating properly. In another example, an entry may have a cause that indicates that the network device 100 reboot due to a power loss. The entry may also include a recommended action that indicates that the power supply of the network device 100 should be replaced with a different power supply. In some embodiments, a recommendation action may be determined, generated, etc., by reboot component 110. For example, reboot component 110 may determine a recommended action based on an analysis of log files 242A through 242Z. In other embodiments, one or more of the processes 220A through 220Z may determine, generate, etc., the recommended action. For example, process 220B may determine a recommended action based on an analysis of log file 242B.

In one embodiment, reboot component 110 may determine that a log file has been created in a storage location in memory after reboot component 110 updated reboot log 241. For example, reboot component 110 may update reboot log 241 (to add an entry and optionally remove a previous entry) based on log files in memory 114 and/or memory 250. Reboot component 110 may remove, rename, etc., the log files in memory 114 and/or memory 250 after reboot component 110 updates reboot log 241. After reboot component 110 updates reboot log 241 to add an entry, a process may create a new log file in memory 250 and/or memory 250. For example, process 220A may not create a log file in the storage location of memory 114 or memory 250 until after the network device 100 has completed a reboot (e.g., a few seconds, a minute, etc., after the network device 100 has rebooted). Reboot component 110 may determine that a new log file is present in the storage location of memory 250 and/or 250. Reboot component 110 may determine a set of additional causes (e.g., one or more additional causes) based on the new log file. Reboot component 110 may update the entry that was added (e.g., the newly added entry, the latest entry) to include the set of additional causes. This may allow reboot component 110 to include causes for the reboot of the network device 100 even though the causes may not be determined until a period of time (e.g., seconds, minutes, etc.) after the network device 100 reboots.

In one embodiment, reboot component 110 may receive a command (e.g., a message, an instruction, etc.) that indicates that one or more entries of reboot log 241 should be removed from reboot log 241. For example, reboot component 110 may receive a command to remove the last two, five, or other appropriate number of entries in reboot log 241. In another example, reboot component 110 may receive a command to remove all of the entries in reboot log 241 (e.g., to clear reboot log 241). In a further example, reboot component 110 may receive a commend identifying one or more entries of reboot log 241 that should be removed (e.g., the command may indicate an index number, a timestamp for the entry, etc.).

In one embodiment, reboot component 110 may publish reboot log 241 to a data store 260 of the network device 100. Various other processes, services, agents, etc., of the network device 100 may use data store to determine the state, status, configuration, settings, etc., of the network device 100. For example, the information and/or data stored in data store 260 may allow the different processes, services, agents, etc., to communicate with each other (e.g., for one process to communicates its current state with another process). In another example, the information stored in data store 260 may allow one process to obtain information about another process (e.g., for one process to determine the actions performed by another process). In a further example, a process may recover its state or configuration if the process is restarted by using the information and/or data in data store 260. By publishing reboot log 241 to data store 260, reboot component 110 may allow other processes, services, agents, etc., to access reboot log 241. In some embodiments, data store 260 may be separate from memories 114 and/or 250. For example, data store 260 may be a separate device (e.g., a separate memory chip). In other embodiments, data store 260 may be part of memory 114 and/or memory 250.

In one embodiment, reboot component 110 may present, display, provide, etc. the data in reboot log 241 (e.g., may present or display the one or more entries) to a user or a computing device. For example, reboot component 110 may present, display, provide, etc., a list of the entries in reboot log 241 via a command line interface (CLI). In another example, reboot component 110 may present, display, provide, etc., a list of the entries in reboot log 241 via a graphical user interface (GUI). Reboot component 110 may present, display, provide, etc., the entries in reboot log 241 in different orders. For example, reboot component 110 may present the entries in chronological order based on the timestamps in the entries (e.g., in order from earliest to latest, or vice versa). In another example, reboot component 110 may present the entries based on the causes in the entries.

In one embodiment, reboot component 110 may transmit reboot log 241 (e.g., transmit a file containing reboot log 241) to another device, such as a server (not illustrated in FIG. 2). This may allow the server to monitor the behavior of different network devices. For example, the server may receive reboot logs from multiple network devices. This may allow the server to analyze the reboot logs from the multiple network devices and identify issues, problems, malfunctions, etc., of the multiple network devices. For example, the server may analyze multiple reboot logs from multiple network devices and may determine that network devices with certain hardware (e.g., a type of processing device, a type of memory, a type of line card, etc.) tend to reboot often due to a specific cause (e.g., due to overheating, due to a particular process crashing or freezing, etc.). This may allow users (e.g., administrators) to troubleshoot, diagnose, resolve, etc., issues or problems that may occur in the network devices.

Figure 3:
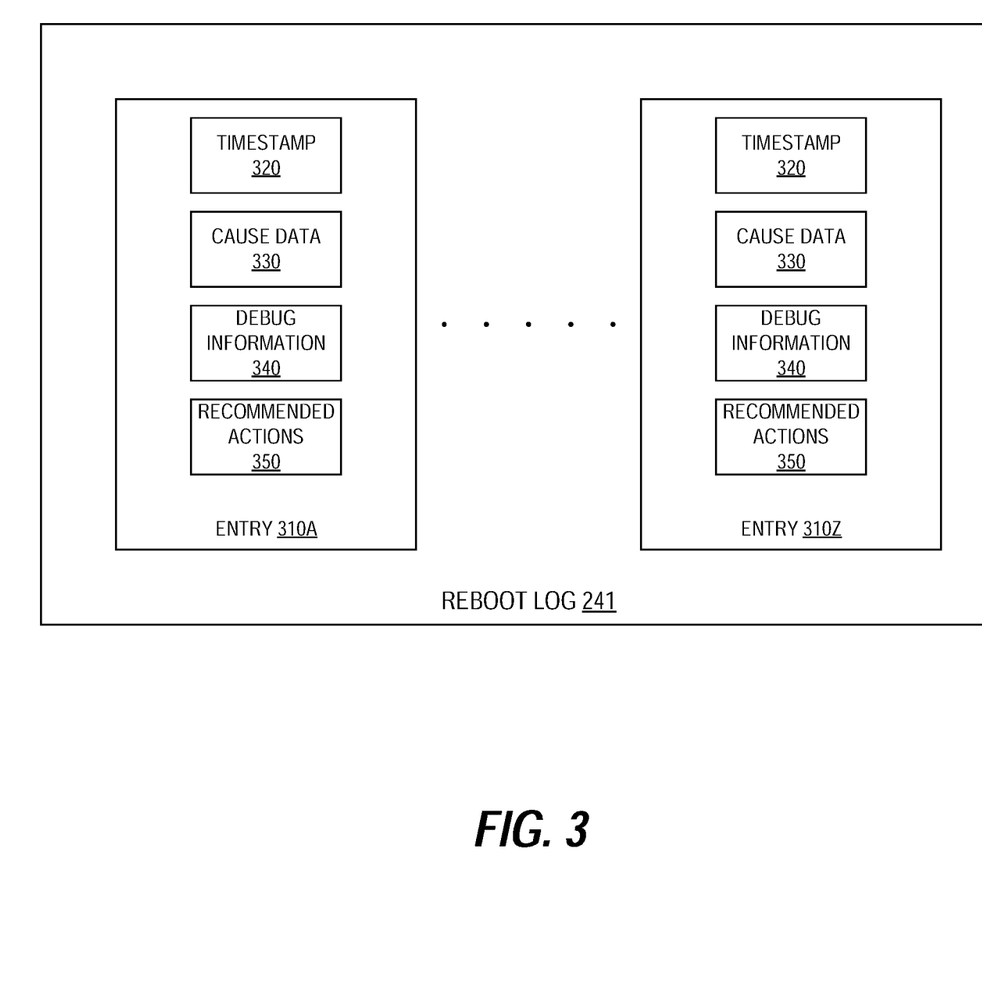
FIG. 3 is a block diagram illustrating an example reboot log, in accordance with some embodiments of the present disclosure.

FIG. 3 is a block diagram illustrating an example reboot log 241, in accordance with some embodiments of the present disclosure. Reboot log 241 may be a file or other data object that may store/include data that is associated with reboots of a network device. Reboot log 241 may have different formats in different embodiments. For example, reboot log 241 may be a delimited text file (e.g., a comma-separate values (CSV) file). In another example, reboot log 241 may be a table with different rows and columns.

Reboot log 241 includes multiple entries 310A through 310Z. As discussed above, each entry 310A through 310Z may be associated with a reboot of a network device (e.g., network device 100 illustrated in FIGS. 1 and 2). For example, each time the network device 100 is rebooted a new entry may be added to reboot log 241 (e.g., created in reboot log 241). Initially, there may be space available (e.g., storage space available, space within reboot log 241, etc., as discussed above) to add new entries to reboot log 241 without removing a previous entry 310X. When there is not enough space to add a new entry, a previous entry 310X may be identified and removed from reboot log 241 and the new entry may be added (e.g., the previous entry may be replaced with the new entry), as discussed above. Previous entry 310X may be identified based on various parameters, criteria, factors, etc. For example, previous entry 310X may be identified based on the timestamp or the causes in the entry.

Each entry 310A through 310Z in reboot log 241 includes a timestamp 320. The timestamp 320 may indicate the time and/or date of the reboot of the network device. The timestamp 320 data that indicates a time and/or date. The timestamp 320 may be in various formats, such as YYYY-MM-DD::HH:MM:SS, where YYYY is the year, MM is the month, DD is the day, HH is the hour, MM is the minute, an SS is the second. In one embodiment, the timestamp 320 may indicate the time and/or date that the one of the entries 310A through 310Z was created in reboot log 241. For example, it may be difficult to determine the exact time that a network device was rebooted, so the timestamp may indicate when one of the entries 310A through 310Z was created in reboot log 241.

Each entry 310A through 310Z also includes cause data 330. The cause data 330 may be data (e.g., text, alphanumeric strings, numbers, etc.) that may indicate one or more causes for the reboot of the network device. For example, the network device 100 may have rebooted due to various causes or reasons. The cause data 330 may indicate each of the causes or reasons for the reboot of the network device, as discussed above. The cause data 330 may include one cause or multiple causes for the reboot of the network device, as discussed above. The cause data 330 may be generated based on an analysis of one or more log files that may be generated by one or more processes (e.g., agents, services, etc.). The cause data 330 may be updated if one or more additional log files are generated by one or more processes after one of the entries 310A through 310Z was created.

In an embodiment, each entry 310A through 310Z may include debug information 340. The debug information 340 may include data that may be used to diagnose, determine, analyze, assess, etc., the network device and/or the causes of the reboot of the network device. For example, the debug information may include a memory dump of a process that crashed or froze, which caused the network device to be rebooted. In another example, the debug information may include a list of temperatures that were detected for a component over a period of time (e.g., the temperatures of a component that were detected over the course of a few minutes, hours, etc.).

In an embodiment, each entry 310A through 310Z may further include recommended actions 350. The recommended actions 350 may be data (e.g., text, alphanumeric strings, etc.) that may provide a user with one or more recommendations, suggestions, information, etc., about how fix, address, correct, etc., the one or more errors and/or conditions that may have caused the network device to reboot. For example, the recommended actions 350 may indicate that a component (which is overheating and causing the network device to reboot) should be replaced. In another example, the recommended actions 350 may indicate that a process (which is crashing and causing the network device to reboot) should be disabled, updated, or configured differently (e.g., executing with different parameters).

As discussed above, reboot log 241 may be published to a data store of the network device. Various other processes, services, agents, etc., of the network device may use the data store to determine the state, status, configuration, settings, etc., of the network device 100. Reboot log 241 (e.g. the entries 310A through 310Z, the timestamps 320, the cause data 330, the debug information 340, and/or the recommended actions 350) may also be presented, displayed, provided, etc., to a user via various interface such as a CLI or a GUI. Reboot log 241 may also be transmitted to another device, such a server.

The data and/or information included in the entries 310A through 310Z (e.g. the timestamps 320, the cause data 330, the debug information 340, and/or the recommended actions 350) may vary in different embodiments. For example, the debug information 340 and/or the recommended actions 350 may be optional in one embodiment. In another example, entry 310B may also include portions of the log files that are generated by various agents, processes, services, etc.

Figure 4:
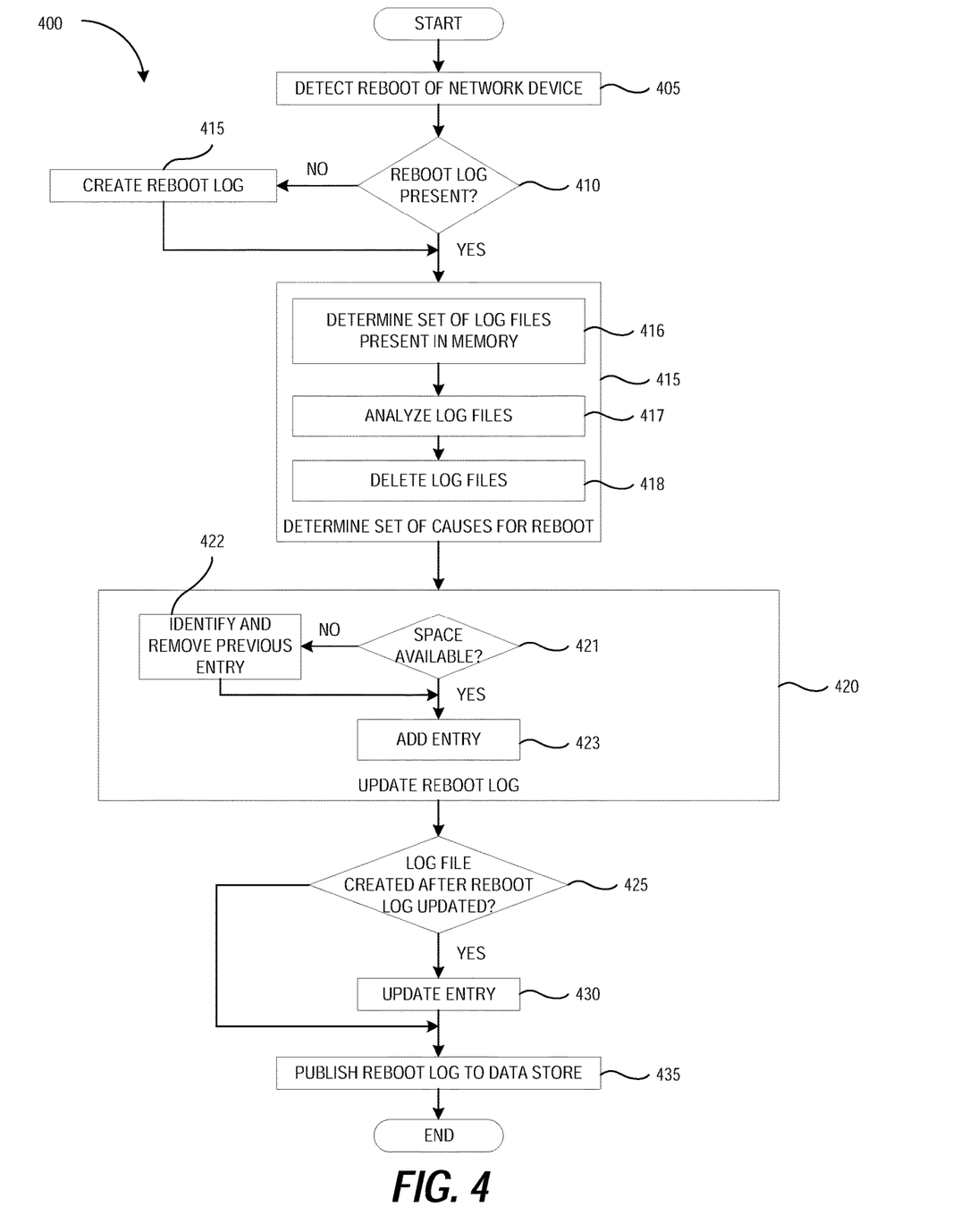
FIG. 4 is a flow diagram of a method of logging a reboot of network device, in accordance with some embodiments of the present disclosure.

FIG. 4 is a flow diagram of a method 400 of logging a reboot of network device, in accordance with some embodiments of the present disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a network device (e.g., network device 100 illustrated in FIGS. 1 and 2), a reboot component (e.g., reboot 110 illustrated in FIG. 2), and/or a processing device (e.g., processing device 108 illustrated in FIG. 2). It should be appreciated that the actions of the method 400 in FIG. 4 can be performed in differing orders, groupings, or subsets than shown in FIG. 4, for various purposes or user preferences.

The method 400 begins at block 405 where the method 400 detects the reboot of a network device. For example, the method 400 may determine that one or more log files are present in a memory. The method 400 may detect the reboot before or after the reboot of the network device (e.g., may determine that a network device is about to reboot or may determine that the network device has already rebooted). At block 410, the method 400 may determine whether a reboot log is present in a memory. If the reboot log is not present, the method 400 may create the reboot log at block 415. If the reboot log is present, the method may proceed to block 415 where the method 400 may determine a set of causes (e.g., one or more causes) for the reboot of the network device.

To determine the set of causes of the reboot, the method 400 may perform blocks 416, 417, and 418. At block 417, the method 400 may determine that a set of log files (e.g., one or more log files) are present in a memory (e.g., in a storage location, such as a directory, of the memory). As discussed above, the set of log files may be created by one or more processes, services, and/or agents executing on the network device. At block 416, the method 400 may analyze the log files. For example, the method 400 may analyze the text in the log files to identify, determine, etc., causes for the reboot of the network device. At block 418, the method 400 may optionally delete the log files. The method 400 may also optionally rename or move the log files at block 418.

At block 420, the method 400 may update the reboot log to include a new entry that is associated with the current (e.g., latest, most recent, etc.) reboot of the network device. To update the reboot log, the method 400 may perform blocks 421, 422, and 423. At block 421, the method 400 may determine whether there is space available to include the new entry. For example, the method 400 may determine whether the reboot log already has the maximum number of entries allowed. In another example, the method 400 may determine whether the reboot log will exceed a threshold size if the new entry is added. If there is no space available, the method 400 may identify a previous entry in the reboot log and may remove the previous entry at block 422. For example, the method 400 may identify the oldest entry in the reboot log and remove the oldest entry. If there is space available, the method 400 may add the new entry in the reboot log at block 423.

At block 425, the method 400 may determine whether additional log files were created after the reboot log was updated (e.g., after the new entry was added to the reboot log). If there are no additional log files created after the new entry was added, the method 400 may proceed to block 435. If there were one or more additional log files created after the new entry was added, the method 400 may update the entry to include one or more causes, based on the one or more additional log files at block 430. At block 435, the method 400 may optionally publish the reboot log to a data store of the network device. As discussed above, various other processes, services, agents, etc., of the network device may use data store to determine the state, status, configuration, settings, etc., of the network device. For example, the data store may allow the different processes, services, agents, etc., to communicate with each other, to obtain information about another process, etc. This may allow other processes, services, agents, etc., to access the reboot log. In another embodiment, the method 400 may present, display, provide, etc. the data in the reboot log (e.g., may present or display the one or more entries) to a user or a computing device. For example, method 400 may present, display, provide, etc., a list of the entries in reboot log 241 via a user interface. In another example, the method 400 may transmit the reboot log to another computing device (e.g., a server computer).

Figure 5:
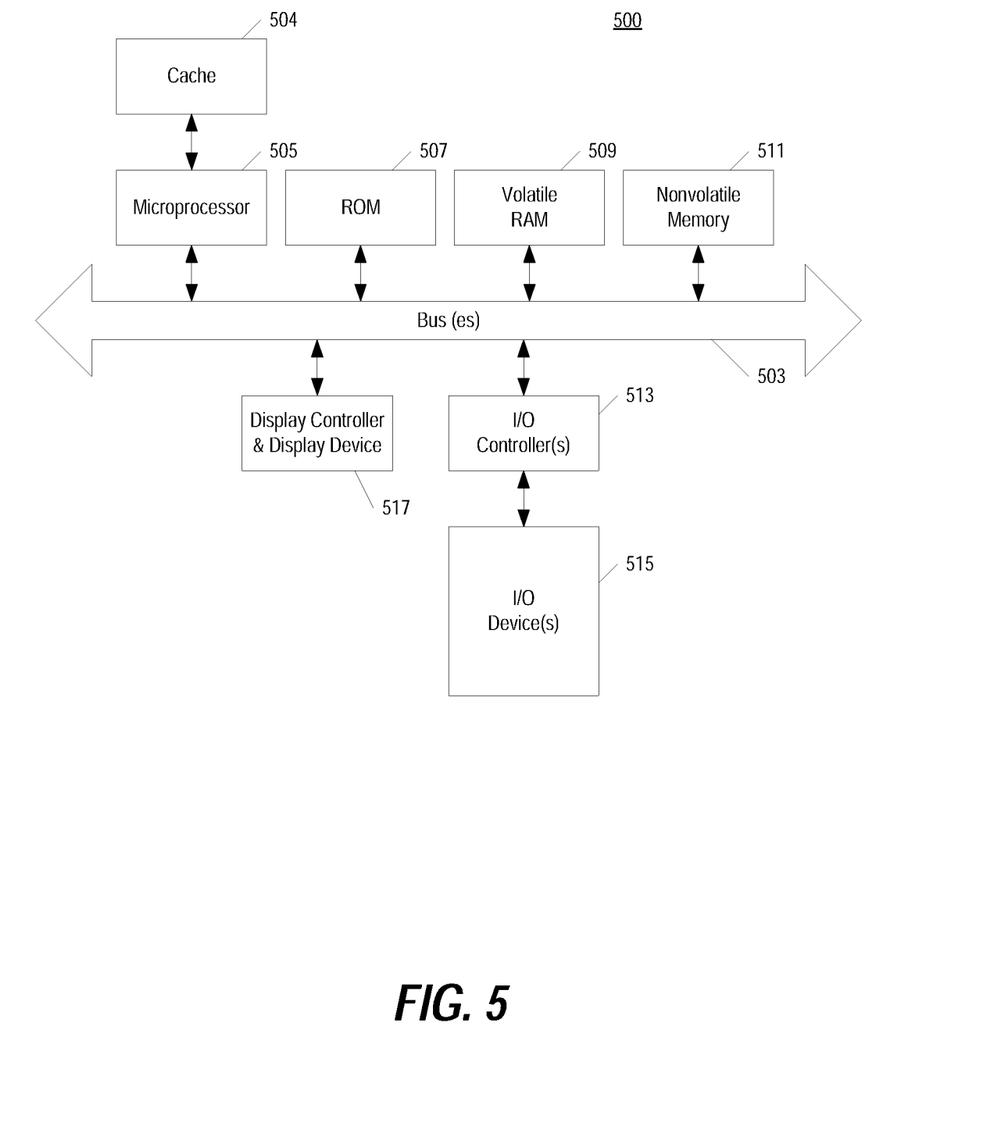
FIG. 5 shows an example a computing device, in accordance with some embodiments of the present disclosure.

FIG. 5 shows an example a computing device 500, in accordance with some embodiments of the present disclosure. For example, the computing device 500 may be implemented including a network device 100 as shown in FIG. 1. Note that while FIG. 5 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 5, the computing device 500, which is a form of a data processing system, includes a bus 503 which is coupled to a microprocessor(s) 505 and a ROM (Read Only Memory) 507 and volatile RAM 509 and a non-volatile memory 511. The microprocessor 505 may retrieve the instructions from the memories 507, 509, 511 and execute the instructions to perform operations described above. The bus 503 interconnects these various components together and also interconnects these components 505, 507, 509, and 511 to a display controller and display device 517 and to peripheral devices such as input/output (I/O) devices which may be mice, keyboards, modems, network interfaces, printers and other devices which are well known in the art. In one embodiment, the computing device 500 includes a plurality of network interfaces of the same or different type (e.g., Ethernet copper interface, Ethernet fiber interfaces, wireless, and/or other types of network interfaces). In this embodiment, the computing device 500 can include a forwarding engine to forward network data received on one interface out another interface.

Typically, the input/output devices 515 are coupled to the system through input/output controllers 513. The volatile RAM (Random Access Memory) 509 is typically implemented as dynamic RAM (DRAM), which requires power continually in order to refresh or maintain the data in the memory.

The mass storage 511 is typically a magnetic hard drive or a magnetic optical drive or an optical drive or a DVD ROM/RAM or a flash memory or other types of memory systems, which maintains data (e.g., large amounts of data) even after power is removed from the system. Typically, the mass storage 511 will also be a random access memory although this is not required. While FIG. 5 shows that the mass storage 511 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 503 may include one or more buses connected to each other through various bridges, controllers and/or adapters as is well known in the art.

Figure 6:
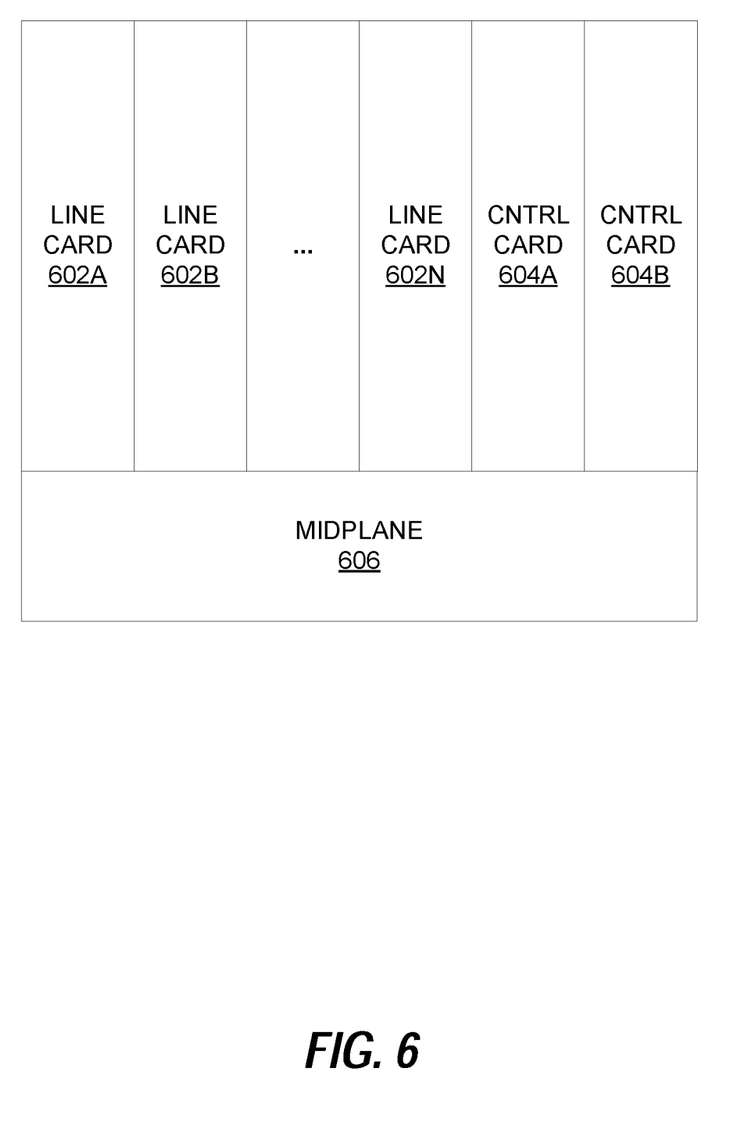
FIG. 6 is a block diagram of one embodiment of an exemplary network device 600, in accordance with some embodiments of the present disclosure.

FIG. 6 is a block diagram of one embodiment of an exemplary network device 600, in accordance with some embodiments of the present disclosure. In FIG. 6, the midplane 606 couples to the line cards 602A-N and controller cards 604A-B. The midplane 606 may also be referred to as a fabric. While in one embodiment, the controller cards 604A-B control the processing of the traffic by the line cards 602A-N, in alternate embodiments, the controller cards 604A-B, perform the same and/or different functions (e.g., updating a software image on the network device, etc.). In one embodiment, the line cards 602A-N process and forward traffic according to the network policies received from the controller cards 604A-B. In one embodiment, the controller cards 604A-B update a reboot log as described herein. In this embodiment, one or both of the controller cards 604A-B may include module to update the reboot log, such as the reboot log 110 as described in FIG. 2. It should be understood that the architecture of the network device 600 illustrated in FIG. 6 is exemplary, and different combinations of cards may be used in other embodiments of the invention.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein. It should be appreciated that descriptions of direction and orientation are for convenience of interpretation, and the apparatus is not limited as to orientation with respect to gravity. In other words, the apparatus could be mounted upside down, right side up, diagonally, vertically, horizontally, etc., and the descriptions of direction and orientation are relative to portions of the apparatus itself, and not absolute.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two blocks in a figure shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
   rebooting a network device;
   detecting, by a reboot component of the network device, the rebooting of the network device;
   determining, by the reboot component of the network device, a set of causes for the rebooting of the network device;
   determining, by the reboot component, storage capacity of a storage where a reboot log is stored,
   the reboot log comprises a current entry and a plurality of previous entries, wherein:
   the current entry indicates the set of causes associated with the rebooting of the network device; and
   the plurality of previous entries indicates sets of causes that are associated with previous reboots of the network device; and
   in response to determining that the storage capacity of the storage is full, updating, by the reboot component, the reboot log by removing one or more of the plurality of previous entries from the reboot log and adding the current entry.

2. The method of claim 1, wherein determining, by the reboot component of the network device, the set of causes for the reboot of the network device comprises:
   determining that a set of log files are present in the storage of a memory of the network device;
   analyzing the set of log files to determine the set of causes.

3. The method of claim 2, wherein:
   a first log file of the set of log files is generated by a process executing on the network device; and
   the reboot of the network device was initiated, at least in part, by the process.

4. The method of claim 2, further comprising:
   determining that a first log file has been created in the storage after the reboot log has been updated;
   determining a set of additional causes based on the first log file; and
   updating the first entry to include the set of additional causes.

5. The method of claim 1, wherein updating the reboot log comprises:
   identifying a first previous entry of the reboot log;
   removing the first previous entry of the reboot log; and
   adding the first entry to the reboot log.

6. The method of claim 5, wherein the first previous entry of the reboot log is identified based on a timestamp of the first previous entry.

7. The method of claim 5, wherein the first previous entry of the reboot log is identified based on a first previous set of causes of the first previous entry.

8. The method of claim 1, wherein updating, by the reboot component, the reboot log comprises:
   determining whether the reboot log is present; and
   in response to determining that the reboot log is not present, creating the reboot log.

9. The method of claim 1, wherein a number of entries in the reboot log is based on a size of a memory for the network device.

10. The method of claim 1, further comprising:
    receiving a command to remove one or more entries of the reboot log; and
    removing the one or more entries from the reboot log based on the command.

11. The method of claim 1, further comprising one or more of:
    publishing the reboot log to a data store of the network device, wherein the data store is used by a set of processes of the network device to determine a state of the network device; or transmitting the reboot log to another device.

12. The method of claim 1, wherein the current entry further comprises:
    a current timestamp indicating a time of the reboot of the network device;

debug information; and a set of recommended actions.

13. The method of claim 1, wherein the reboot log is persistent across multiple reboots of the network device.

14. The method of claim 1, wherein to the reboot component is an operating system of the network device.

15. The method of claim 1, wherein to the reboot component is a hardware component of the network device.

16. The method of claim 1, wherein determining that the storage capacity of the storage is full comprises determining that the storage capacity is less than that is needed to add the current entry.

17. A network device, comprising:

a persistent memory to store a reboot log; and a processing device coupled to the memory, the processing device configured to:

reboot a network device;

detect, by a reboot component of the network device, the reboot of the network device;

determine, by the reboot component of the network device, a set of causes for the reboot of the network device;

determine, by the reboot component, storage capacity of a storage where a reboot log is stored, the reboot log comprises a current entry and a plurality of previous entries, wherein:

the current entry indicates the set of causes associated with the rebooting of the network device; and the plurality of previous entries indicates sets of causes that are associated with previous reboots of the network device; and in response to determining that the storage capacity of the storage is full, updating, by the reboot component, the reboot log by removing one or more of the plurality of previous entries from the reboot log and adding the current entry.

18. The network device of claim 17, wherein to determine the set of causes for the reboot of the network device the processing device is further configured to:

determine that a set of log files are present in a storage of the network device;

analyze the set of log files to determine the set of causes; and delete the set of log files.

19. The network device of claim 17, wherein to update the reboot log the processing device is further configured to:

identify a first previous entry of the reboot log;

remove the first previous entry of the reboot log; and add the first entry to the reboot log.

20. A non-transitory machine-readable medium having executable instructions to cause one or more processing devices to perform a method to update a reboot log, the method comprising:

rebooting a network device;

detecting, by a reboot component of the network device, the reboot of the network device;

determining, by the reboot component of the network device, a set of causes for the reboot of the network device, wherein determining the set of causes comprises:

determining that a set of log files are present in a storage of a memory of the network device; and analyzing the set of log files to determine the set of causes for the reboot of the network device;

determining, by the reboot component, storage capacity of the storage where the reboot log is stored, the reboot log comprises a current entry and a plurality of previous entries, wherein:

the current entry indicates the set of causes associated with the reboot of the network device; and the plurality of previous entries indicates sets of causes that are associated with previous reboots of the network device; and in response to determining that the storage capacity of the storage is full, updating, by the reboot component, the reboot log by removing one or more of the plurality of previous entries from the reboot log and adding the current entry.

* * * * *